US009807001B2

(12) United States Patent
Previdi et al.

(10) Patent No.: US 9,807,001 B2
(45) Date of Patent: Oct. 31, 2017

(54) SEGMENT ROUTING USING A REMOTE FORWARDING ADJACENCY IDENTIFIER

(71) Applicant: Cisco Technology, Inc., San Jose, CA (US)

(72) Inventors: Stefano B. Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 14/334,300

(22) Filed: Jul. 17, 2014

(65) Prior Publication Data

US 2016/0021000 A1    Jan. 21, 2016

(51) Int. Cl.
*H04L 12/723*    (2013.01)
*H04L 12/741*    (2013.01)

(52) U.S. Cl.
CPC ............ *H04L 45/507* (2013.01); *H04L 45/50* (2013.01); *H04L 45/74* (2013.01)

(58) Field of Classification Search
CPC ........ H04L 45/507; H04L 45/50; H04L 45/74
See application file for complete search history.

(56) References Cited

U.S. PATENT DOCUMENTS

| 6,374,303 | B1 | 4/2002 | Armitage et al. ............ 709/242 |
| 6,577,600 | B1 | 6/2003 | Bare .............................. 370/238 |
| 6,647,428 | B1 | 11/2003 | Bannai et al. ................ 709/245 |
| 6,963,570 | B1 | 11/2005 | Agarwal .................... 370/310.2 |
| 7,023,846 | B1 | 4/2006 | Andersson et al. .......... 370/389 |
| 7,031,253 | B1 | 4/2006 | Katukam et al. ............. 370/222 |
| 7,031,607 | B1 | 4/2006 | Aswood Smith ............... 398/51 |
| 7,061,921 | B1 | 6/2006 | Sheth ........................ 370/395.52 |
| 7,068,654 | B1 | 6/2006 | Joseph et al. ................. 370/392 |
| 7,072,346 | B2 | 7/2006 | Hama ....................... 370/395.53 |
| 7,088,721 | B1 | 8/2006 | Droz et al. ................. 370/395.1 |
| 7,154,416 | B1 | 12/2006 | Savage ........................... 341/51 |

(Continued)

FOREIGN PATENT DOCUMENTS

| CN | 102132533 A | 7/2011 | ............. H04L 12/56 |
| CN | 102299852 A | 12/2011 | ............. H04L 12/56 |

(Continued)

OTHER PUBLICATIONS

Psenak, Peter et al., "Enforcing Strict Shortest Path Forwarding Using Strict Segment Identifiers"; U.S. Appl. No. 15/165,794, filed May 26, 2016; consisting of Specification, Claims, Abstract, and Drawings (52 pages).

(Continued)

*Primary Examiner* — Thai Nguyen
(74) *Attorney, Agent, or Firm* — Campbell Stephenson LLP

(57) ABSTRACT

Disclosed is an apparatus and method for segment routing using a remote forwarding adjacency identifier. In one embodiment, a first node in a network receives a packet, wherein the packet is received with a first segment-ID and another segment ID attached thereto. The first node detaches the first and the other segment IDs from the packet. Then the first node attaches a first label to the packet. Eventually, the first node forwards the packet with the attached first label directly to a second node in the network. In one embodiment, the other segment ID corresponds to a forwarding adjacency or tunnel label switched path between the first node and another node.

20 Claims, 8 Drawing Sheets

(56) References Cited

U.S. PATENT DOCUMENTS

| | | | |
|---|---|---|---|
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/389 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi et al. | 370/235 |
| 9,112,734 B2 | 8/2015 | Edwards et al. | |
| 9,118,572 B2 | 8/2015 | Sajassi | |
| 2001/0037401 A1 | 11/2001 | Soumlya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Slerekl | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0037117 A1 | 3/2008 | Tanaka | 370/471 |
| 2008/0075016 A1 | 3/2008 | Ashwood-Smith | 370/252 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0049194 A1 | 2/2009 | Csaszar | 709/242 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0296710 A1 | 12/2009 | Agrawal | 370/392 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.53 |
| 2010/0284309 A1 | 11/2010 | Allan et al. | 370/256 |
| 2011/0060844 A1 | 3/2011 | Allan et al. | 709/241 |
| 2011/0063986 A1 | 3/2011 | Denecheau et al. | 370/248 |
| 2011/0228780 A1 | 9/2011 | Ashwood-Smith | 370/392 |
| 2011/0261722 A1 | 10/2011 | Awano | 370/254 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1 | 12/2012 | Vasseur | 370/228 |
| 2013/0003728 A1 | 1/2013 | Kwong et al. | 370/389 |
| 2013/0051237 A1 | 2/2013 | Ong | 370/237 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0189156 A1 | 7/2014 | Morris | 709/238 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |
| 2015/0023328 A1 | 1/2015 | Thubert et al. | 370/336 |
| 2015/0030020 A1 | 1/2015 | Kini | 370/389 |
| 2015/0263940 A1 | 9/2015 | Kini | 370/236.2 |
| 2016/0006614 A1 | 1/2016 | Zhao | 370/254 |
| 2016/0352654 A1 | 12/2016 | Filsfils et al. | 370/392 |
| 2017/0019330 A1 | 1/2017 | Filsfils et al. | 370/389 |
| 2017/0104673 A1 | 4/2017 | Bashandy et al. | 370/392 |
| 2017/0111277 A1 | 4/2017 | Previdi et al. | 370/392 |

FOREIGN PATENT DOCUMENTS

| | | | | |
|---|---|---|---|---|
| CN | 102498694 A | 6/2012 | | H04L 12/56 |
| CN | 102714625 A | 10/2012 | | H04L 12/56 |

OTHER PUBLICATIONS

Nainar, Nagendra Kumar et al., "Reroute Detection in Setment Routing Data Plane"; U.S. Appl. No. 15/266,498, filed Sep. 15, 2016; consisting of Specification, Claims, Abstract, and Drawings (61 pages).

Filsfils, Clarence et al., "Segment Routing Into a Label Distribution Protocol Domain"; U.S. Appl. No. 15/280,262, filed Sep. 29, 2016;

(56) References Cited

OTHER PUBLICATIONS consisting of Specification, Claims, Abstract, and Drawings (28 pages)
Alcatel-Lucent, "Segment Routing and Path Computation Element—Using Traffic Engineering to Optimize Path Placement and Efficiency in IP/MPLS Networks"; Technology White Paper; 2015; 28 pages.
Awduche, D. et al., "Requirements for Traffic Engineering Over MPLS"; Network Working Group; Request for Comments: 2702; Sep. 1999; pp. 1-29.
Awduche, D. et al., "Overview and Principles of Internet Traffic Engineering"; Network Working Group; Request for Comments: 3272; May 2002; pp. 1-71.
Filsfils, C. et al., "Segment Routing Architecture"; draft-ietf-spring-segment-routing-07; Network Working Group, Internet-Draft; Dec. 15, 2015; pp. 1-24.
Filsfils, C. et al., "Segment Routing Use Cases", draft-filsfils-rtgwg-segment-routing-use-cases-02; Network Working Group; Internet-Draft; Oct. 21, 2013; pp. 1-36.
Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.
Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages.).
Psenak, Peter et al., "Enforcing Strict Shortest Path Forwarding Using Strict Segment Identifiers" U.S. Appl. No. 15/165,794, filed May 26, 2016; consisting of Specification, Claims, Abstract, and Drawings (52 pages).
Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).
Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).
Filsfils, C. et al., Cisco Systems, Inc., "Segment Routing Interoperability with LDP", draft-filsfils-spring-segment-routing-ldp-interop-01.txt; Apr. 18, 2014; pp. 1-16.
Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.
Awduche, Daniel O., et al., "RSVP-TE: Extensions to RSVP for LSP Tunnels," Network Working Group, Internet-Draft, Feb. 2001, pp. 1-12.
Awduche, Daniel O., et al., "RSVP-TE: Extensions to RSVP for LSP Tunnels," Network Working Group, Request for Comments 3209, Dec. 2001, pp. 1-61.
Backes, P. and Rudiger Geib, "Deutsche Telekom AG's Statement About IPR Related to Draft-Geig-Spring-OAM-Usecase-01," Aug. 23, 2012, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Crabbe, E., et al., "PCEP Extensions for MPLS-TE LSP Protection with Stateful PCE Draft-Crabbe-PCE-Stateful-PCT-Protection-00," Network Working Group, Internet-Draft, Apr. 2013, pp. 1-12.
Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.
Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Enginerring—Resource Reservation Protocol-Traffic Enginerring (RSVP-TE) Extensions, Newtork Working Group, Request for Comments 5151, Feb. 2008.
Fedyk, D., et al., Alcatel-Lucent, Generalized Multiprotocol Label Switching (GMPLS) , Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, pp. 1-28.
Filsfils, C., et al., Cisco Sytems, Inc., "Segment Routing Architecture," draft-filsfils-rtgwg-segment-routing-01, Network Working Group, Internet-Draft, Oct. 21, 2013; pp. 1-28.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Gerlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS data plan moniotoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.

(56) References Cited

OTHER PUBLICATIONS

Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Cisco Systems, Inc., "Introduction to Intermediate System-to-Intermediate System Protocol," published 1992-2002; pp. 1-25.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Eckert, Toerless et al., "Traffic Engineering for Bit Indexed Explicit Replication", U.S. Appl. No. 14/814,574, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.
Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.
Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.
Akiya, N. et al., "Seamless Bidirectional Forwarding Detection (BFD) for Segment Routing (SR)"; draft-akiya-bfd-seamless-sr-03; Internet Engineering Task Force; Internet-DraftAug. 23, 2014; 7 pages.
Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.
Akiya, N., "Segment Routing Implications on BFD"; Sep. 9, 2013; 3 pages.
Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.
Filsfils, C. et al.; "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing with MPLS Data Plane", draft-ietf-spring-segment-routing-mpls-05; Network Working Group; Internet-Draft; Jul. 6, 2016; 15 pages.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.
Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.
Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.

US 9,807,001 B2

SEGMENT ROUTING USING A REMOTE FORWARDING ADJACENCY IDENTIFIER

BACKGROUND

Network nodes can use forwarding tables to forward packets towards their destination. Network nodes may take form in one or more routers, one or more bridges, one or more switches, one or more servers, or any other suitable communications processing device. A packet is a formatted unit of data that typically contains control information and payload data. Control information may include: source and destination IP addresses, error detection codes like checksums, sequencing information, etc. Control information is typically found in packet headers and trailers, with payload data in between.

Packet forwarding requires a decision process that, while simple in concept, can be complex in implementation. Since packet forwarding decisions are handled by network nodes, the time needed to make packet forwarding decisions can become a major limiting factor in overall network performance.

Multiprotocol Label Switching (MPLS) is one packet forwarding mechanism employed by network nodes. MPLS Nodes can make packet forwarding decisions based on Label Distribution Protocol (LDP) labels (hereinafter labels). Packet forwarding based on labels stands in stark contrast to traditional Internet Protocol (IP) routing in which packet forwarding decisions are based on IP addresses contained within packets.

DETAILED DESCRIPTION

1. Overview

Figure 1:
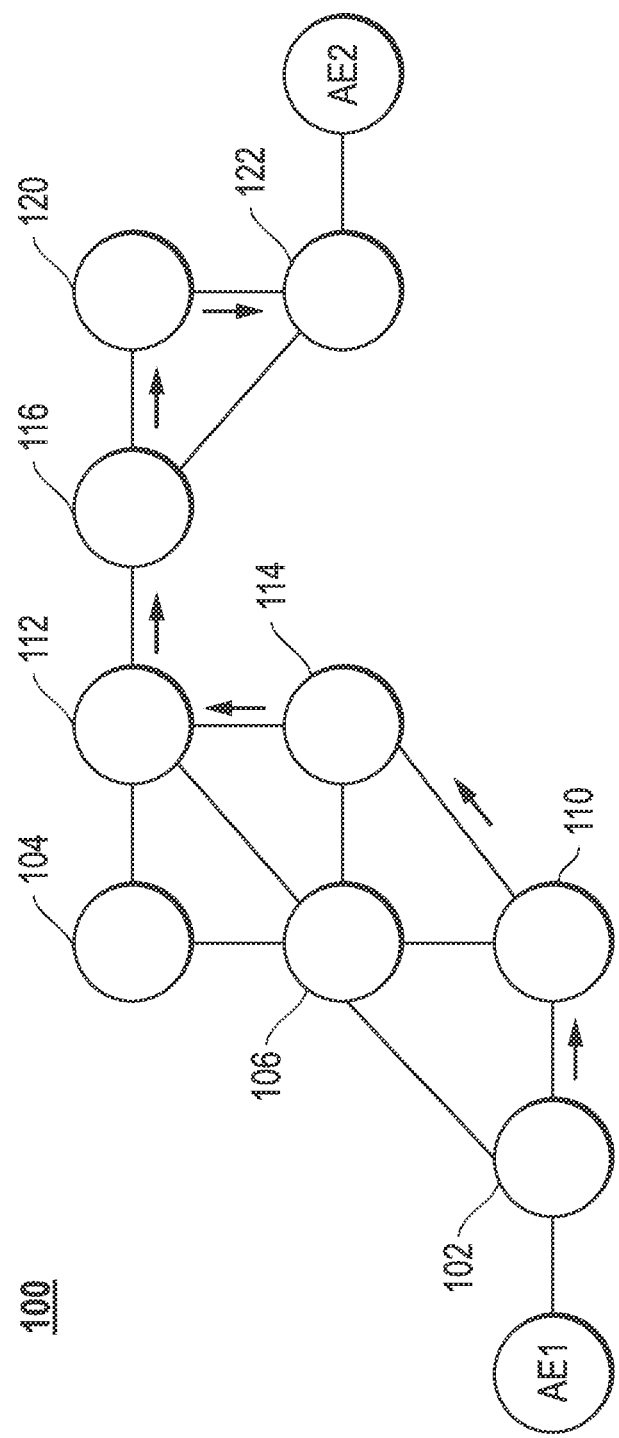
FIG. 1 is a block diagram illustrating an example provider network.

Disclosed is an apparatus and method for segment routing using a remote forwarding adjacency identifier. In one embodiment, a first node in a network receives a packet, wherein the packet is received with a first segment-ID and another segment ID attached thereto. The first node detaches the first and the other segment IDs from the packet. Then the first node attaches a first label to the packet. Eventually, the first node forwards the packet with the attached first label directly to a second node in the network. In one embodiment, the other segment ID corresponds to a forwarding adjacency or tunnel label switched path between the first node and another node.

2. Packet Forwarding Mechanisms

IP routing and MPLS are distinct packet forwarding mechanisms. IP routing uses IP addresses inside packet headers to make packet forwarding decisions. In contrast, MPLS implements packet forwarding decisions based on short path identifiers called labels attached to packets. Segment routing (SR) is yet another packet forwarding mechanism. SR is similar to MPLS in many regards and employs many of the data plane functions thereof. For example, packet forwarding decisions in SR can be based on short path identifiers called segment IDs attached to packets. While similarities exist between MPLS and SR, substantial differences exist between SR and MPLS as will be more fully described below.

2.1 IP Packet Routing

IP packet routing uses IP forwarding tables, which are created at nodes using routing information advertised by nodes via one or more protocols like the internal gateway protocol (IGP) and/or the border gateway protocol (BGP). In simple terms, IP forwarding tables map destination IP addresses to the next hops that packets take to reach their destinations. When a node receives a packet, the node can access an IP forwarding table using the packet's destination IP address to lookup a corresponding egress interface to the next hop. The node then forwards the packet through the egress interface. The next hop that receives the packet performs its own forwarding table lookup using the same destination IP address in the packet, and so on.

2.2 MPLS and LDP

MPLS is commonly employed in provider networks consisting of interconnected LDP nodes. Packets enter an MPLS network via an ingress edge LDP node, travel hop-by-hop along a label-switched path (LSP) that typically includes one or more core LDP nodes, and exit via an egress edge LDP node.

Nodes along an LSP forward packets based on labels and LDP forwarding tables. Labels allow for the use of very fast and simple forwarding engines in the data planes of nodes. Another benefit of MPLS is the elimination of dependence on a particular Open Systems Interconnection (OSI) model data link layer technology to forward packets.

A label is a short, fixed-length, locally significant identifier that can be mapped to a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc.

LDP is employed in the control planes of nodes. For purpose of explanation only, LDP nodes are those nodes that employ LDP in their control plane. Two LDP nodes, called LDP peers, can exchange labels on a FEC by FEC basis when creating an LSP. Nodes create and maintain LDP forwarding tables that map labels and next hop egress interfaces. These forwarding tables can be used to forward packets through MPLS networks as more fully described below.

Tunnel LSPs can be created using resource reservation protocol (RSVP) tunnel engineering (TE) between a headend LDP node and a tailend LDP node. A tunnel LSP setup can be driven by a TE application executing on the headend node and is identified as a session that specifies the tailend node for the LSP, a tunnel identifier, and an extended tunnel identifier, which is typically an identifier of the headend node. The headend node or another component signals a PATH message destined towards the tailend node. The PATH message can include policy link-admission control information, which identifies the sender that is setting up the LSP, and a flow specification that defines the nodes desired on the tunnel LSP. Each hop along the LSP examines the PATH message, verifies the policy control information, saves the path state that is associated with the session, and sets aside the requested resources specified by the sender. When the tailend node is reached, it initiates a hop-by-hop reservation (RESV) toward the headend node, along the reverse direction taken by the PATH message. At each node including the tailend, the session-state is updated, the earmarked resources are reserved for the session, and a label is allocated for use by the prior hop node. When the RESV reaches the headend node, the LSP setup for the session is complete. Tunnel LSPs can be advertised as forwarding adjacencies between head end and tail end nodes as will be more fully described below.

When a packet is received by an ingress edge LDP node of an MPLS network, the ingress node may use information in the packet to determine a FEC mapped to an LSP the packet can take across the network to reach the packet's destination IP address. For purposes of explanation only, this disclosure will presume that FECs take form in unique identifiers of egress edge nodes that are closest to the destination IP addresses, it being understood that FECs should not be limited thereto. In this embodiment, FECs may take form in egress edge nodes' loopback addresses.

Characteristics for determining the FEC for a packet can vary, but typically the determination is based on the packet's destination IP address. Quality of Service for the packet or other information may also be used to determine the FEC. Once determined, the ingress edge LDP node can access a table to select a label that is mapped to the FEC. The table may also map a next hop egress interface to the FEC. Before the ingress edge LDP node forwards the packet to the next hop via the egress interface, the ingress node attaches the label.

When an LDP node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the LDP node swaps the incoming label with the outgoing label. The next hop receives the packet with label and may perform the same process. This process is often called hop-by-hop forwarding along a non-explicit path (i.e., the LSP). The penultimate node in the LSP may pop or remove the incoming label before forwarding the packet to the terminal node such as an egress edge LDP node in the network, which in turn may forward the packet towards its destination using the packet's destination IP address and an IP forwarding table. In another embodiment, the egress edge LDP node may pop the incoming label before forwarding the packet.

FIG. 1 illustrates an example of packet transmission over an LSP. FIG. 1 shows an example network 100 that includes LDP nodes 102-122 coupled together via communication links. An LSP is created between nodes 102 and 122. Node 102 receives a stream of packets from node AE1 that is destined for node AE2. The packets are associated with a particular FEC, which in turn is mapped to an LSP that extends from node 102 to node 122. Each node in the LSP maintains information for the LSP established through it in an LDP forwarding table. If node 110 knows that node 114 is the next hop along the LSP for all the packets received from node 102 that are destined for node 122, node 110 can forward the packets to node 114.

2.3 Segment Routing

Segment routing (SR) is a mechanism in which nodes forward packets using SR forwarding tables and segment IDs. SR enables very fast and simple forwarding engines in the data plane of nodes. In one embodiment, SR nodes are MPLS nodes that do not employ LDP. SR is not dependent on a particular Open Systems Interconnection (OSI) model data link layer technology to forward packets.

SR nodes (i.e., nodes employing SR) make packet forwarding decisions based on segment IDs as opposed to labels, and as a result SR nodes need not employ LDP in their control planes. In one embodiment, segment IDs are substantially shorter than labels. Alternatively, segment IDs and labels can be the same length. The range for segment IDs may be distinct from the range for labels. Unless otherwise indicated, the SR nodes lack LDP in their control plane.

Packets can enter an SR enabled network (i.e., a network of nodes that are SR enabled) via an ingress edge SR node, travel hop-by-hop along a segment path (SP) that includes one or more core SR nodes, and exit the network via an egress edge SR node.

Like labels, segment IDs are short (relative to the length of an IP address or a FEC), fixed-length identifiers. Segment IDs may correspond to topological segments of a network. Topological segments can represent one hop or multi hop paths to nodes. Topological segments can act as sub-paths that can be combined to form an SP. Stacks of segment IDs can represent SPs, and SPs can be associated with FECs as will be more fully described below.

There are several types of segment IDs including node-segment IDs, adjacency-segment IDs, remote forwarding adjacency (FA)-segment IDs, etc. Node-segment IDs are assigned to SR nodes so that no two SR nodes belonging to a network domain are assigned the same node-segment ID. A node-segment ID corresponds to a one-hop or multi-hop, shortest path (SPT) to an SR node assigned the node-segment ID as will be more fully described below. In one embodiment, all assigned node-segment IDs are selected from a predefined ID range (e.g., [32, 5000]) that is distinct from ranges assigned to adjacency-segment IDs, remote FA-segment IDs, and labels. As will be more fully described, nodes can advertise their node-segment IDs mapped to their loopbacks.

An adjacency-segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency-segment IDs; adjacency-segment IDs may not be unique within a network. This disclosure will presume that only one link exists between nodes in a network, it being understood the present disclosure should not be limited thereto.

Each SR node can assign a distinct adjacency-segment ID for each of the node's links. Adjacency-segment IDs are locally significant; separate SR nodes may assign the same adjacency-segment ID, but the adjacency-segment ID represents distinct links. In one embodiment, adjacency-segment IDs are selected from a predefined range that is outside the predefined range for node-segment IDs.

As will be more fully described below with respect to hybrid networks that contain a mix of SR and LDP nodes, a remote FA-segment ID represents a tunnel LSP between a pair of LDP enabled nodes referred to as the head end and tail end nodes. The head end node may also be SR enabled. Thus, the head end node can be both SR and LDP enabled. The SR/LDP head end node can advertise a remote FA-segment ID for a tunnel LSP to the tail end node. All remote FA-segment IDs are selected from a predefined range of IDs that are outside the ranges for the node-segment IDs and adjacency-segment IDs. Head end and/or tail end nodes can create a tunnel LSP on their own initiative or under instruction from a path computation node (PCN). As will be more fully described, these tunnel LSPs can facilitate transportation of packets between an SR ingress node and LDP egress node in a hybrid network.

Remote FA-segment IDs are locally significant. As a result remote FA-segment IDs should only be mapped in SR/LDP head end nodes that advertise the remote FA-segment IDs. In general, remote FA-segment IDs can be mapped in memory of SR/LDP nodes to respective tunnel LSPs. In one embodiment, SR/LDP nodes can map their remote FA-segment IDs to respective labels for respective tunnel LSPs.

All nodes within a provider network can advertise routing information including their loopbacks using IGP. SR nodes can advertise routing information including node-segment IDs bound to loopbacks, adjacency-segment IDs mapped to link IDs, remote FA-segment IDs bound to tail end nodes, etc., using IGP with an SR extension.

Nodes can use the routing information they receive to create topology maps of the network in which they are contained. The maps can then be used to calculate shortest paths (SPTs) to destination nodes in the network. SR nodes can then identify egress interfaces connected to SPTs. If a SPT is calculated for a destination SR enabled node, the egress interface for the SPT can be mapped in the node's SR forwarding table to the node-segment ID for the destination SR enabled node. To illustrate, a node can use the topology map it creates to identify next hop egress interfaces for SPTs to destination nodes that are identified by respective loopbacks. For those nodes that advertise their node segment-IDs mapped to their loopbacks, the identified next hop egress interfaces for the loopbacks can mapped to respective node-segment IDs in the SR forwarding table. SR nodes can also map their adjacency-segment IDs to egress interfaces for respective links in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID should be the only node in the network area that has a SR forwarding table that maps the adjacency-segment ID to an egress interface. SR/LDP nodes can map their remote FA-segment IDs to labels for respective tunnel LSPs in SR forwarding tables or separate tables in memory. SR/LDP nodes can map labels, including labels associated with tunnel LSPs, to egress interfaces in LDP forwarding tables. Accordingly, SR/LDP nodes can indirectly map remote FA-segment IDs to egress interfaces.

As noted above, SR enables the creation of segment paths (SPs) in a network. SPs can be mapped to FECs. Packets associated with the same FEC normally traverse the same SP towards their destination. Nodes in SPs make forwarding decisions based on segment IDs, not based on the contents (e.g., destination IP addresses) of packets. As such, packet forwarding in SPs is not dependent on a particular Layer 2 technology.

SR edge nodes and/or other devices (e.g., a path computation node (PCN)) can use advertised information (node-segment IDs bound to loopbacks, adjacency-segment IDs mapped to link IDs, etc.) and topological maps to create ordered lists of segment IDs (i.e., segment ID stacks). Segment ID stacks correspond to respective SPs. Individual segment IDs in a stack may correspond to respective segments or sub paths of a corresponding SP. The stack may include a combination of node-segment IDs, adjacency-segment IDs, remote FA-segment IDs, etc.

When an ingress edge SR node receives a packet, the node or PCN, can determine an SP for the packet based on information contained in the packet. In one embodiment, a FEC may be determined for the packet using the packet's destination address. The FECs herein are presumed to be loopbacks of the egress edge nodes that are closest to the destination IP addresses of received packets. The FEC for the received packet is then used to select a segment ID stack mapped thereto. The ingress edge node can attach the selected segment ID stack to the packet. The packet with attached stack is forwarded along and traverses the segments of the SP in an order that corresponds to the list order of the segment IDs in the stack. A forwarding engine operating in the data plane of each SR node along the SP, can use the top segment ID within the stack to lookup the egress interface for next hop. For example, the forwarding engine can access an SR forwarding table to read the egress interface mapped to the top segment ID.

As the packet and attached segment ID stack are forwarded along the SP in a hop-by-hop fashion, segment IDs can be popped off the top of the stack. In another embodiment, the attached stack of segment IDs remains unchanged as the packet is forwarded along the SP. In this embodiment, a pointer to an active segment ID in the stack can be advanced as the packet is forwarded along the SP. In contrast to MPLS, however, segment IDs are not swapped with other segment IDs as the packet and attached segment ID stack are forwarded along the SP in one embodiment.

Figure 2:
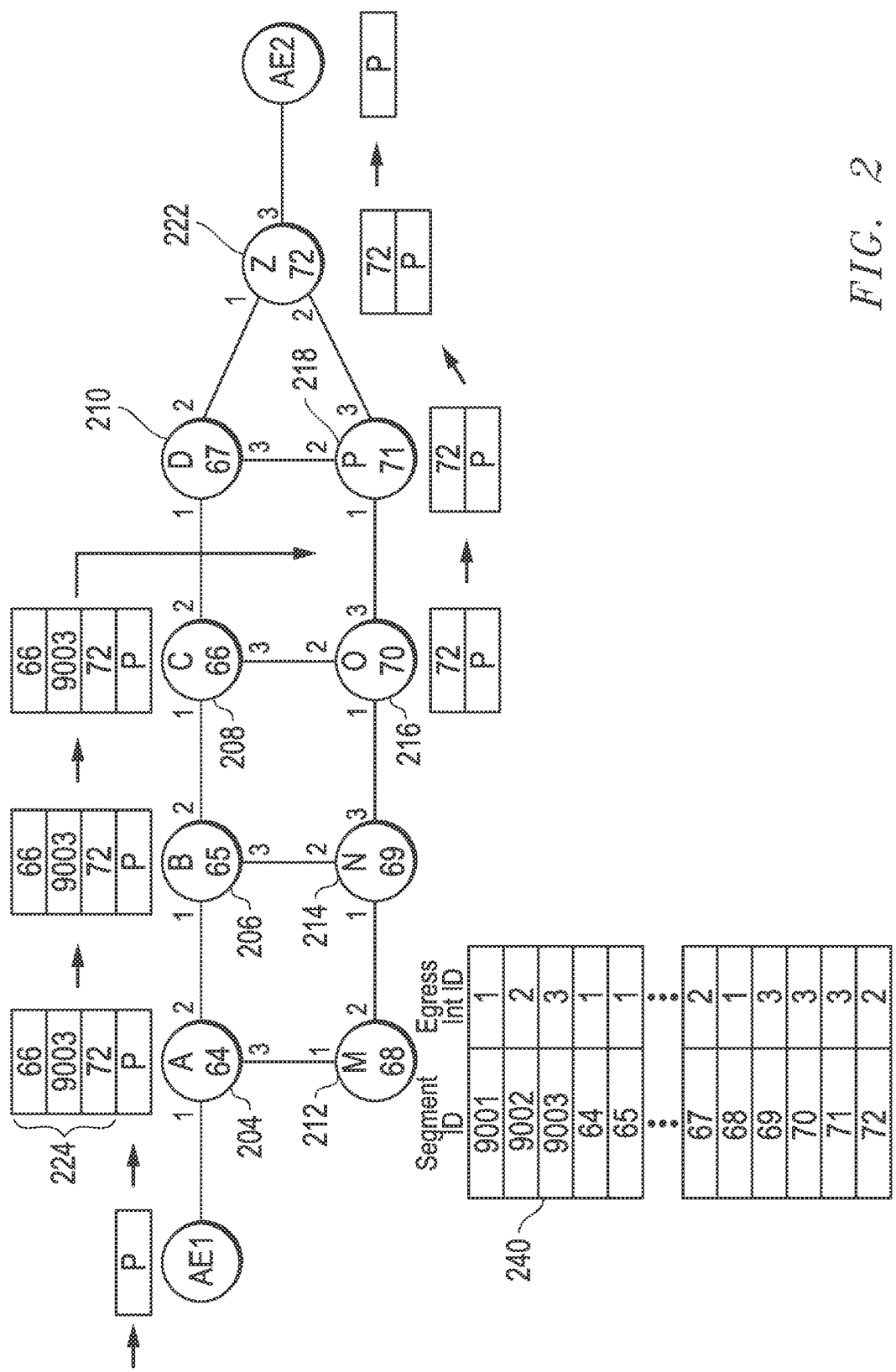
FIG. 2 is a block diagram illustrating another example provider network.

To illustrate general concepts of SR, FIG. 2 shows an example SR enabled provider network that is in data communication with nodes AE1 and AE2. Network 202 consists of SR nodes 204-222. As shown, nodes 204-210 are assigned unique node-segment IDs 64-67, respectively, nodes 212-218 are assigned unique node-segment IDs 68-71, respectively, and node 222 is assigned unique node-segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, and loopback Z is assigned to node 222. These loopbacks are unique in the network and can be used for several purposes such as calculating the topology of network 202, which in turn can be used to create SPs and/or to calculate SPTs and thus next hop egress interfaces for SR forwarding tables. Nodes 204-222 can also assign locally significant adjacency-segment IDs. For example, node 208 can assign adjacency-segment IDs 9001-9003 to link IDs CB, CD, and CO, respectively.

Each of SR nodes 204-222 can advertise routing information to other nodes in network 202 using IGP with SR extension. For example, node 208 can generate and send one or more advertisements that include adjacency-segment IDs 9001-9003 bound to link IDs CB, CD, and CO, respectively, and node-segment ID 66 bound to loopback C. One of ordinary skill understands that advertisements may contain additional information. Using the advertisements they receive, the control planes of nodes 204-222 can generate respective SR forwarding tables for use in the data planes. For example, node 208 can generate example SR forwarding table 240 that maps adjacency-segment IDs 9001-9003 to node interface IDs 1-3, respectively, and node-segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. It is noted that in the embodiment shown, only SR forwarding table 240 maps adjacency-segment IDs 9001-9003 to interfaces; SR forwarding tables in the other nodes of network 202 should not map adjacency-segment IDs 9001-9003.

In addition to creating SR forwarding tables, SR nodes or a PCN (not shown) can create segment ID stacks for respective SPs. For example, ingress edge node 204 creates example segment ID stack 224 for an SP between edge nodes 204 and 222. Example segment stack 224 can be created for a particular FEC (e.g., FEC Z). Example stack 224 includes three segment IDs: node-segment IDs 66 and 72 advertised by nodes 208 and 222, respectively, and adjacency-segment ID 9003 advertised by node 208. Stack 224 corresponds to an SP in which packets flow in order through nodes 204, 206, 208, 216, 218, and 222.

In response to receiving a packet that is destined for a device that can be reached via AE2, which in turn can be reached via node 222, SR node 204 can select a segment ID stack based on information contained in the packet. For example, node 204 can select FEC Z (i.e., the loopback for node 222) for a received packet P based on the destination IP address in packet P and/or other information. FEC Z is mapped to example stack 224 in a table not shown. Node 204 attaches stack 224 to packet P. Example segment stack 224 lists segment IDs that correspond to one hop and multi hop segments that packets traverse to reach egress edge node 222. The one hop and multi hop segments collectively form the SP corresponding to stack 224. Once the segment stack 224 is attached to packet P, ingress SR enable node 204 may access a SR forwarding table (not shown) using the top segment ID (e.g., segment ID=66) to read egress interface identifier 2, which is the next hop egress interface for the SPT to the SR node assigned node-segment ID 66.

Figure 3:
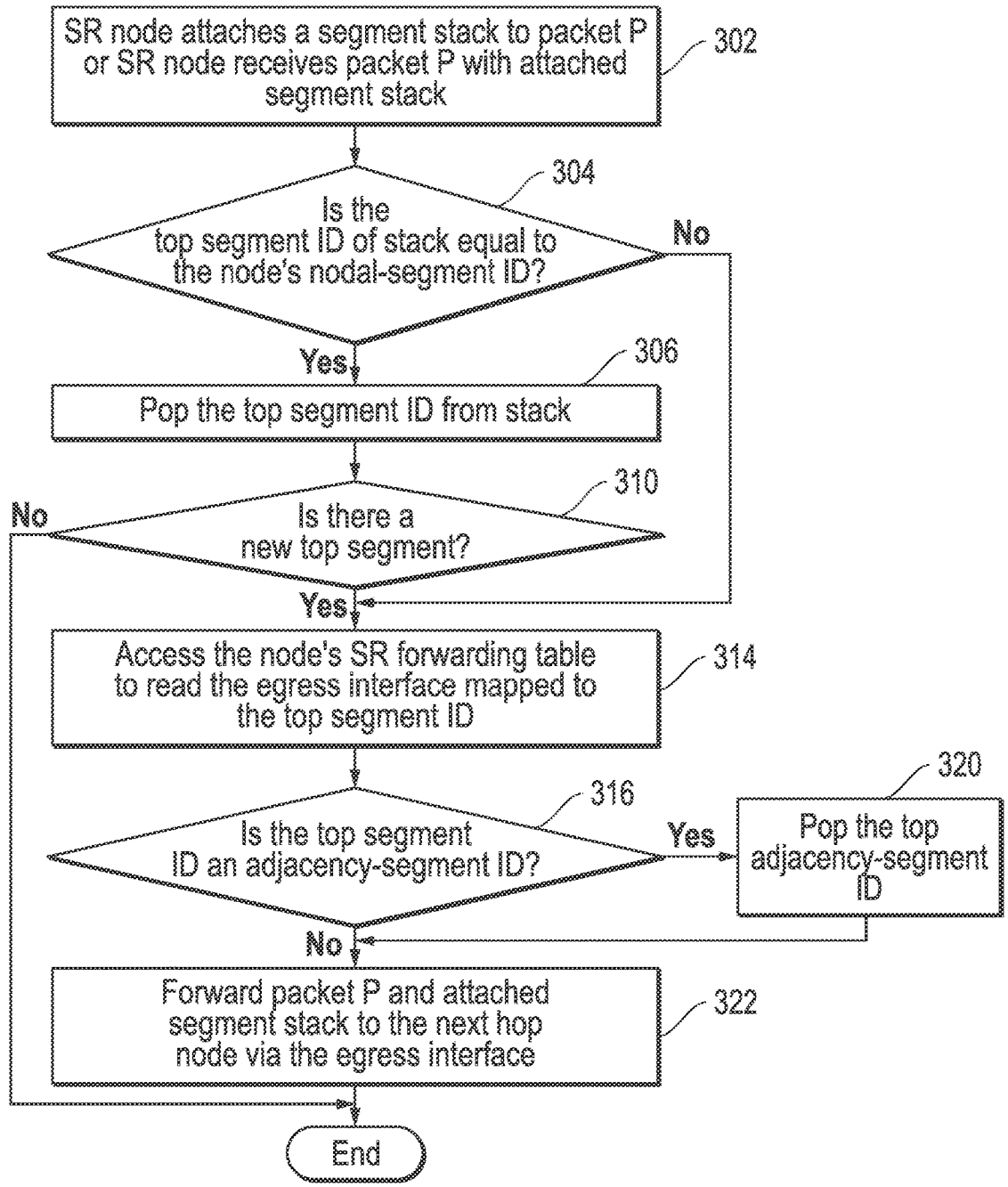
FIG. 3 is a flow chart illustrating an example process employed by a node of the network shown in FIG. 2.

With continuing reference to FIG. 2, FIG. 3 illustrates example process of packet forwarding by a node using segment IDs according to one embodiment. More particularly, FIG. 3 illustrates an example method performed by an SR node, including an edge node, in a network like that shown in FIG. 2. In response to receiving a packet with an attached segment ID stack, or in response to attaching a segment ID stack to a packet, the SR node determines in step 304 whether the top segment ID of the stack matches the node-segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the stack) the packet P has presumably arrived at the egress edge node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency-segment ID. This determination can be implemented by simply comparing the top segment ID with the designated range of adjacency-segment IDs that are available for assignment within the network. If the top segment ID is found to be within the designated range, the top segment ID is an adjacency-segment ID and it is popped. In step 322 the SR node forwards packet P and attached stack to the next node via the egress interface identified in step 314.

With continuing reference to FIG. 3, FIG. 2 shows packet P and attached stack 224 as it is forwarded by nodes. As shown, nodes 204 and 206 forward packet P and stack 224 without popping a segment ID. However, node 208 pops node-segment ID 66 and adjacency-segment ID 9003 in accordance with steps 306 and 320, respectively, before the packet P and stack 224 are forwarded to node 216 in accordance with step 322. Nodes 216 and 218 forward packet P and stack 224 without popping segment IDs. SR egress edge node 222 recognizes itself as the last hop of the SP. Eventually, node 222 may employ traditional IP routing and forward packet P to access node AE2 based the destination IP address within packet P.

3. Hybrid Networks

FIGS. 1 and 2 illustrate example provider networks that contain LDP nodes and SR nodes, respectively. Some providers may employ hybrid networks or networks that contain both LDP and SR nodes. These hybrid networks may employ both SPs and LSPs to transport packets. Differences in the packet forwarding mechanisms described above with respect to SR and LDP nodes, however, may preclude interoperability between SR and LDP nodes when directly coupled to each other.

A hybrid network can successfully implement packet transport if, in one embodiment, the hybrid network employs SR/LDP nodes (i.e., nodes that implement both SR and LDP) to bridge the differences between SR nodes and LDP nodes. As will be more fully described below SR/LDP nodes can acts as merge points between SPs and LSPs and facilitate transport of packets across a hybrid network.

Figure 4:
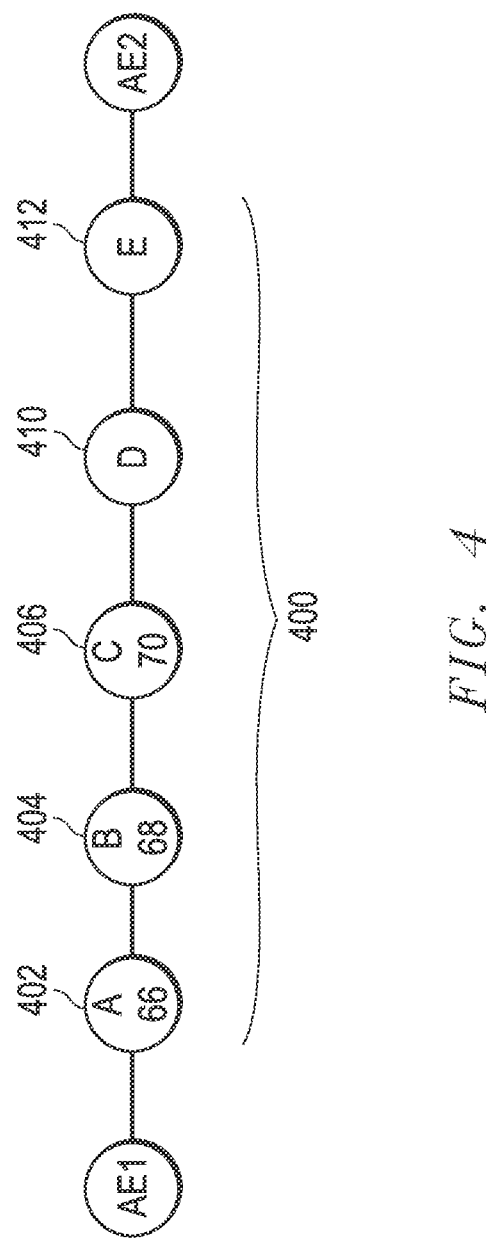
FIG. 4 is a block diagram illustrating yet another example provider network.

FIG. 4 illustrates a portion of an example hybrid network 400 that employs LDP, SR, and SR/LDP nodes. Nodes 402 and 404 are SR enabled, node 406 is SR/LDP enabled, and nodes 410 and 412 are LDP enabled Like the nodes shown within FIG. 2, the nodes in network 400 are identified by unique loopbacks. In the illustrated example, nodes 402-412 are assigned loopbacks A-E, respectively. Each of the SR and SR/LDP nodes is assigned a node-segment ID that is unique within network 400. Specifically, nodes 402-406 are assigned node-segment ID's 66-70, respectively.

All nodes within network 400 may employ IGP to advertise routing information such as their loopbacks. SR and SR/LDP nodes can extend their implementations of IGP to advertise loopbacks mapped to respective node-segment IDs. SR/LDP nodes may act as headends of tunnel LSPs. As will be more fully described below, SR/LDP nodes can advertise their tunnel LSPs as forwarding adjacencies to tail end LDP nodes, including LDP edge nodes. In this regard, an SR/LDP node may advertise that a tail end LDP node, such as node 412, can be reached through the SR/LDP node via a tunnel LSP.

All nodes within network 400 may use routing information they receive in order to create topology maps of the network. SR and SR/LDP nodes can use the topology maps to create or update SR forwarding tables in the manner described above. However, SR and SR/LDP nodes cannot create SR forwarding entries that map egress interfaces to node segment IDs for LDP nodes since LDP nodes lack node-segment IDs. The procedure described above for creating SR forwarding tables, however, can be modified to accommodate forwarding adjacencies or tunnel LSPs to LDP nodes in a hybrid network.

Figure 5:
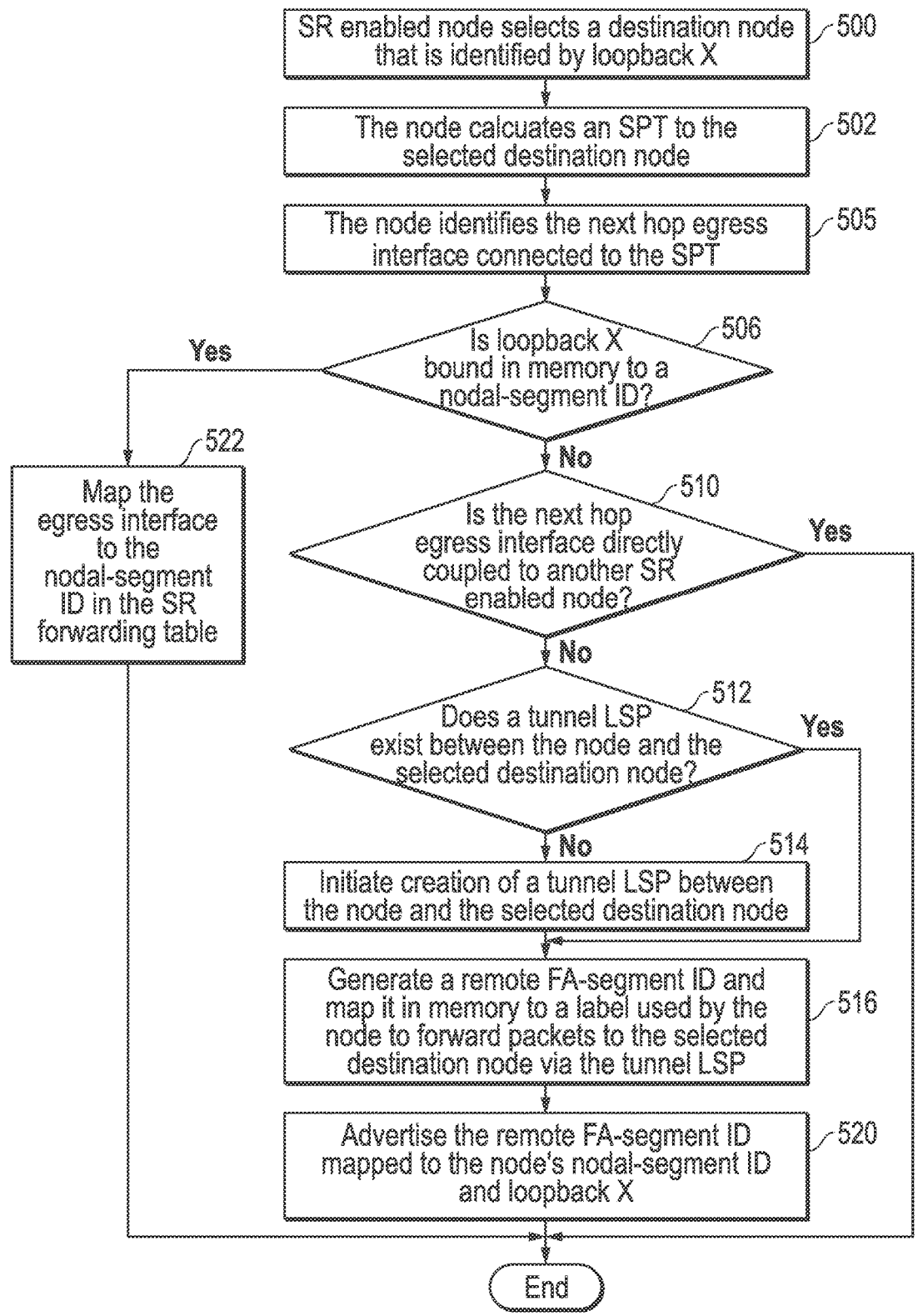
FIG. 5 is a flow chart illustrating an example process employed by a node of the network shown in FIG. 4.

FIG. 5 illustrates relevant portions of an example process employed by an SR or SR/LDP node in a hybrid network like that shown in FIG. 4 when creating entries in an SR forwarding table. The process shown in FIG. 5 begins when the node selects a destination node identified by loopback X. In step 502 the node uses the topology map it has to calculate an SPT to the selected destination node identified by loopback X. In step 505, the node then identifies the next hop egress interface connected to the SPT. The node determines whether the selected destination node is SR enabled. In one embodiment, this determination can be made by accessing memory that stores routing information received from other nodes to see whether the node previously received an advertisement that mapped loopback X to a node-segment ID. If so, the selected destination node is SR enabled, and the node maps the next hop egress interface identified in step 505 to the node-segment ID of the destination node as shown in step 522. If, however, the node determines that loopback X is not mapped to a node-segment ID in step 506, the destination node is presumably an LDP node, and cannot be directly reached by an SP. However, the selected destination node may be reached via a tunnel LSP. To that end the node determines whether the next hop egress interface identified in step 505 is directly coupled to an SR enabled node. If so, the process ends. However, SR/LSP nodes are coupled to LDP nodes, which are not SR enabled. If the node determines the next hop egress interface identified in step 505 is directly coupled to an LDP node, the process proceeds to step 512 in which the node determines whether a tunnel LSP exists between the node and the destination LDP node identified by loopback X. The node can access memory using loopback X to determine whether a tunnel LSP has been mapped thereto. If a tunnel LSP is not mapped in memory to loopback X, the node may initiate the creation of a tunnel LSP as shown in step 514. Alternatively, a PCN upon request can initiate the creation of a tunnel LSP between the node and the destination LDP node. Ultimately, the SR/LDP node can generate a remote FA-segment ID and map it in memory to a label of the preexisting or newly created tunnel LSP as shown in step 516. Once mapped, the node can advertise the remote FA-segment ID bound to loopback X and/or the node's node-segment ID. This advertisement may also include the loopback of the node. The advertisement use TLV-22 with a flag indicating a remote FA-segment ID and a metric of MAXMETRIC-1. In this fashion, other nodes in the network including SR enabled edge nodes, can learn about the tunnel LSP between the node and the tail end destination LDP node identified by loopback X.

As noted above, SR/LDP nodes can function as merge points between LSPs, including LSP tunnels, and SPs in a hybrid network. In doing so, an SR/LDP can facilitate the transport of a data packet from an SR ingress node, such as SR node 402, to an LDP egress node, such as LDP node 412 via an SP and an tunnel LSP. To illustrate, ingress SR node 402 may receive a packet P destined for a device that is reachable via node AE2. In response to receiving the packet, ingress SR node 402 or a PCN may select a FEC for packet P based upon information such as the packet's destination IP address. In the illustrated example, node 402 may select loopback E as the FEC for packet P. The selected FEC can be mapped in memory of node 402 to a segment ID stack. This segment ID stack can be used to transfer packet P from ingress SR node 402 to SR/LDP node 406 via an SP that includes SR node 404, and SR/LDP node 406, in turn, can transfer packet P received from ingress SR node 402 to egress LDP node 412 via a tunnel LSP therebetween.

Figure 6:
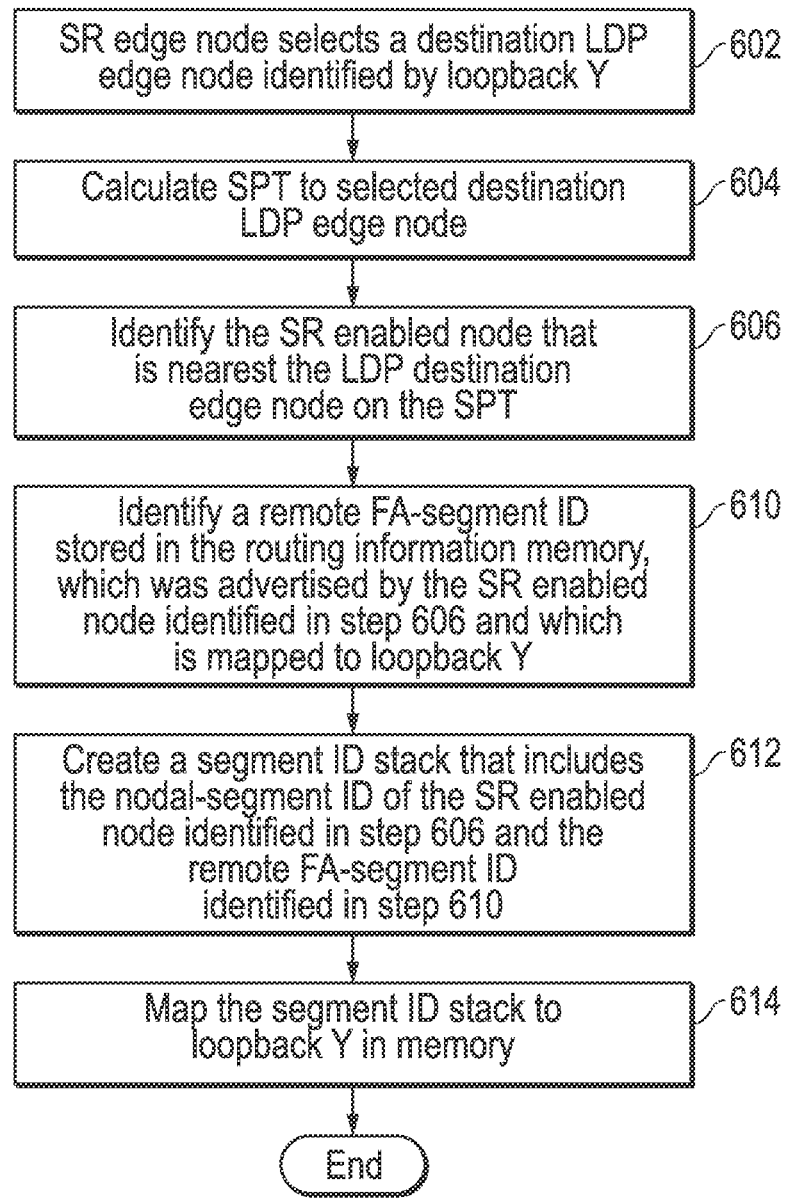
FIG. 6 is a flow chart illustrating an example process employed by a node of the network shown in FIG. 4.

Before SR node 402 can select the segment ID stack needed to transport packet P across the network to LDP edge node 412, SR node 402 or a PCN must calculate the segment ID stack. SR edge nodes can create segment ID stacks for transporting packets between SR edge nodes and LDP edge nodes using the remote FA-segment IDs mapped to LDP destination nodes that were advertised by SR/LDP nodes. In other words, using routing information, including remote FA-segment IDs, SR edge nodes or PCNs can calculate segment ID stacks for SPs that can be used in part to transport packets to egress LDP nodes such as node 412 shown in FIG. 4. FIG. 6 illustrates portions of an example process employed by an SR edge node or PCN when creating a segment ID stack for transporting a packet to an LDP edge node via an SP. As will be more fully described, the process shown uses advertisements generated by the process shown in FIG. 5. FIG. 6 will be described with reference to an SR edge node, it being understood that the process can be employed in another type of node such as a PCN.

In step 602, the SR edge node selects an LDP destination edge node identified by loopback Y. The SR edge node can access memory that stores routing information received from other nodes to determine those edge nodes that lack loopbacks mapped to node-segment IDs in order to identify LDP destination edge nodes. The LDP destination edge node may be reachable via a combination of an SP and an LSP such as an existing tunnel LSP. In step 604, the SR edge node calculates an SPT to the selected LDP destination node. The SPT can be expressed as a sequence of loopbacks corresponding to respective nodes in the SPT between the SR edge node and the selected LDP destination node. The loopback sequence may be arranged in order of nearest to the LDP destination node. Thus, the first loopback in the sequence corresponds to the node closest to the LDP destination node, and the last loopback in the sequence corresponds to the node farthest from the LDP destination node. Using its memory that stores routing information, including those loopbacks mapped to respective node-segment IDs, the SR edge node identifies the SR enabled node on the SPT that is nearest the selected LDP destination edge node. This identified SR enabled node should be an SR/LDP node. Presuming the SR/LDP node identified in step 606 advertised one or more remote FA-segment IDs for tunnel LSPs to respective LDP nodes, the SR edge node accesses the memory storing routing information it received to identify a remote FA-segment ID advertised by the identified SR/LDP node, which remote FA-segment ID is also mapped to the selected LDP destination edge node. In response to identifying the remote FA-segment ID mapped through the loopback for the selected LDP edge node, the SR edge node creates a segment stack that includes the node-segment ID of the identified SR/LDP node and remote FA-segment ID. Lastly, the SR edge node maps the segment ID stack to loopback Y in memory of the SR edge node and the egress interface connected to the calculated SPT. The segment ID stack created in step 612 includes 2 segment IDs: the node-segment ID of the identified SR/LDP node and the remote FA-segment ID that is mapped thereto. The node-segment ID is the top or first segment ID within the segment stack.

As noted above, SR/LDP nodes can function as merge points between tunnels LSP and SPs as will be more fully described below. In doing so, an SR/LDP can facilitate the transfer of a data packet across a hybrid network from an SR ingress node, such as SR node 402, to an LDP egress node, such as LDP node 412. In the illustrated example described above, ingress SR node 402 receives packet P destined for a device that is reachable via node AE2. In response to receiving the packet, ingress SR node 402 or a PCN selects loopback E as the FEC for packet P. The selected FEC is mapped in memory to a segment ID stack consisting of the node-segment ID for SR/LDP node 406 and a remote FA-segment ID corresponding to a tunnel LSP between nodes 406 and 412. This segment ID stack can be used to transfer packet P from ingress SR node 402 to SR/LDP node 406, and SR/LDP node 406, in turn, can then transfer packet P to egress LDP node 412 via the tunnel LSP therebetween.

Figure 7:
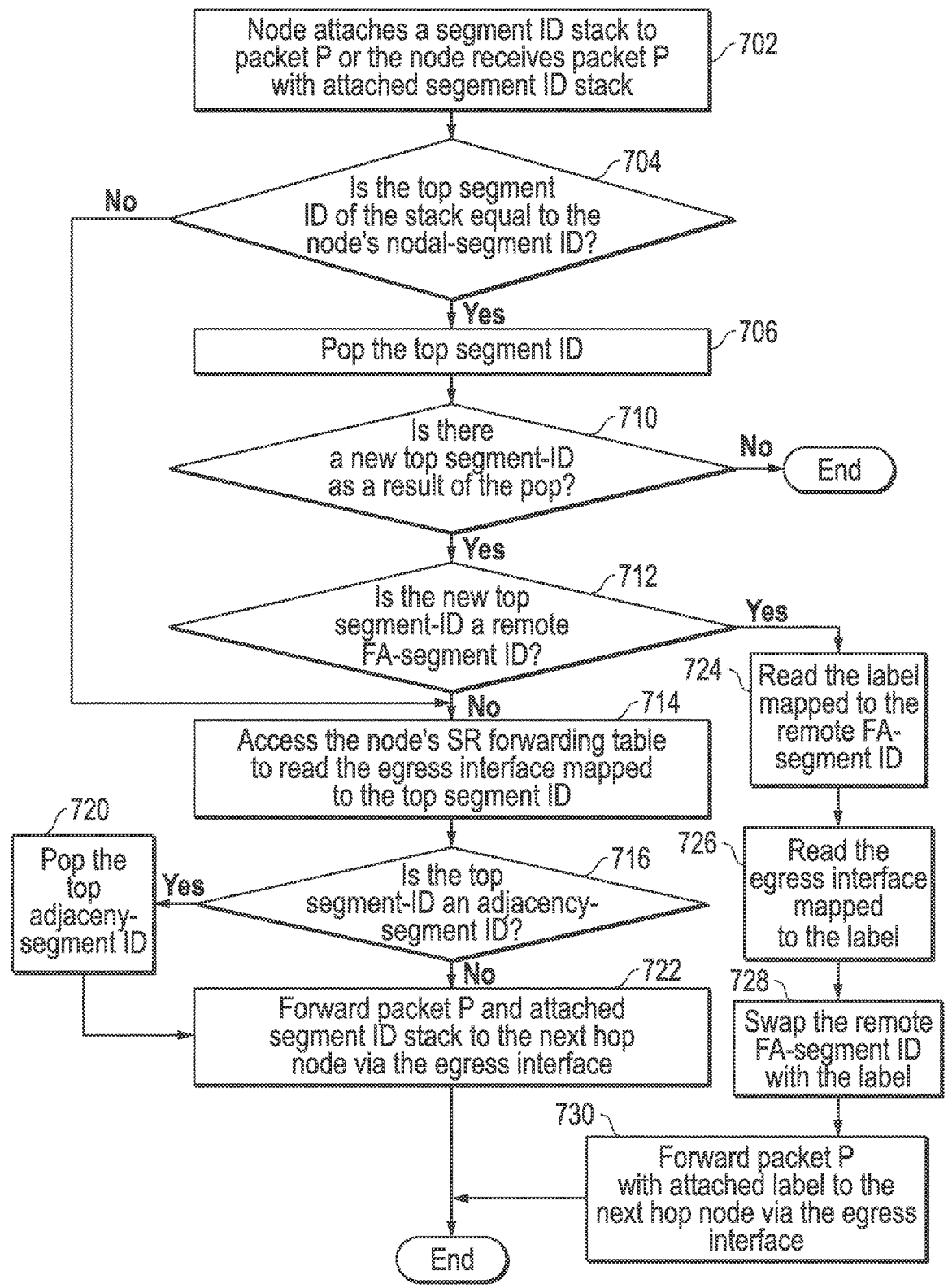
FIG. 7 is a flow chart illustrating an example process employed by a node of the network shown in FIG. 4.

FIG. 7 illustrates an example process employed by SR or SR/LDP nodes in a hybrid network for forwarding a data packet. In response to receiving a packet with an attached segment ID stack, or in response to attaching a segment ID stack to a packet, the node determines in step 704 whether the top segment ID of the stack matches the node-segment ID assigned to the node. If there is a match, the process proceeds to step 706 where the node pops the top segment ID, which may expose an underlying segment ID as the new top segment ID. If there is no new top segment ID (i.e., the segment popped in 706 was the last segment ID of the stack) the packet has arrived at the terminal node of the SP, and the process ends. If a new top segment ID is exposed, the node determiners whether it is a remote FA-segment ID. The node can make this determination if the new top segment ID falls within the predefined range of segment IDs reserved for remote FA-segment IDs. If the new top segment is not a remote FA-segment ID or if there is no match of segment IDs in step 704, the node accesses its SR forwarding table in step 714 to read the egress interface that is mapped to the top segment ID. In step 716 the node determines whether the top segment ID is an adjacency-segment ID. This determination can be implemented by simply comparing the top segment ID with the designated range for adjacency-segment IDs. If the top segment ID is found to be within the designated range, the top segment ID is an adjacency-segment ID and it is popped. In step 722 the SR node forwards packet P and attached stack to the next node via the identified egress interface.

If the node determines in step 712 that the new top segment ID is a remote FA-segment ID, then the node accesses memory to read a label mapped thereto as shown in step 724. The node can then access an LDP forwarding table to read the egress interface mapped to the label. In step 730, the node swaps the remote FA segment ID with the label and forwards the packet to the next hop node via the egress interface, which in the illustrated example is an LDP node of a tunnel LSP. By forwarding the packet with attached label, the node transfers the packet from an SP to a tunnel LSP.

Figure 8:
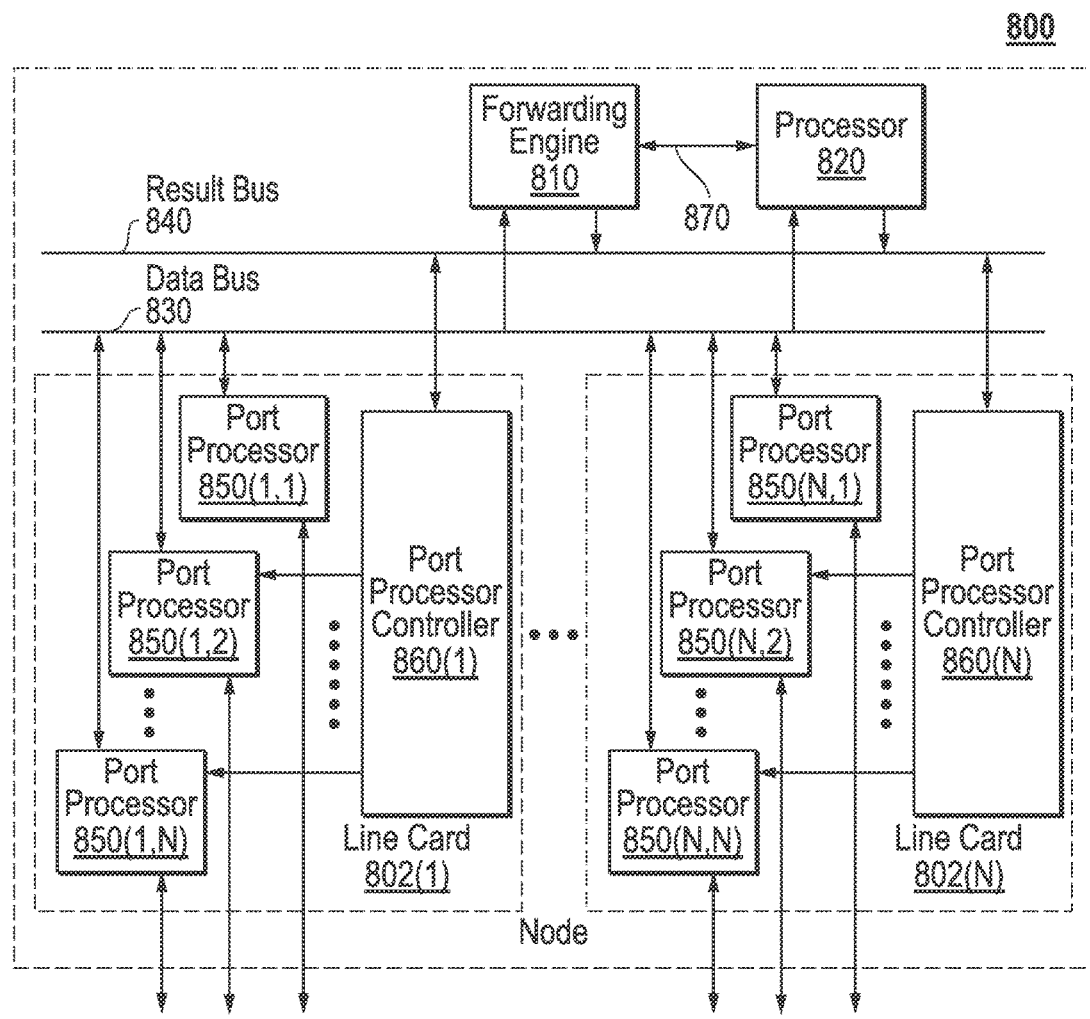
FIG. 8 is a block diagram illustrating certain components of an example node that can be employed in the networks of FIG. 1, 2 or 4.

FIG. 8 is a block diagram illustrating certain additional and/or alternative components of a node that can be employed in the networks described above. In this depiction, node 800 includes a number of line cards (line cards 802(1)-(N)) that are communicatively coupled to a forwarding engine or packet forwarder 810 and a processor 820 via a data bus 830 and a result bus 840. Line cards 802(1)-(N) include a number of port processors 850(1,1)-(N,N) which are controlled by port processor controllers 860(1)-(N). It will also be noted that forwarding engine 810 and processor 820 are not only coupled to one another via data bus 830 and result bus 840, but are also communicatively coupled to one another by a communications link 870.

The processors 850 and 860 of each line card 802 may be mounted on a single printed circuit board. When a packet or packet and header are received, the packet or packet and header with segment stack or label may be identified and analyzed by router 800 in the following manner. Upon receipt, a packet (or some or all of its control information) or packet and header is sent from the one of port processors 850(1,1)-(N,N) at which the packet or packet and header was received to one or more of those devices coupled to data bus 830 (e.g., others of port processors 850(1,1)-(N,N), forwarding engine 810 and/or processor 820). Handling of the packet or packet and header can be determined, for example, by forwarding engine 810. For example, forwarding engine 810 may determine that the packet or packet and header should be forwarded to one or more of port processors 850(1,1)-(N,N). This can be accomplished by indicating to corresponding one(s) of port processor controllers 860(1)-(N) that the copy of the packet or packet and header held in the given one(s) of port processors 850(1,1)-(N,N) should be forwarded to the appropriate one of port processors 850(1,1)-(N,N). In addition, or alternatively, once a packet or packet and header has been identified for processing, forwarding engine 810, processor 820 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's information or the packet and its header's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

A computer readable memory (CRM) is disclosed and stores instructions. A node is capable of implementing a method in response to executing the instructions. The method includes receiving a packet, wherein the packet is received with a first segment-ID and another segment ID attached thereto. The method further includes detaching the first and the other segment IDs from the packet, and attaching a first label to the packet after the first and the other segment IDs are detached. The method also includes forwarding the packet with the attached first label directly to a second node.

What is claimed is:
1. A method comprising:
receiving a packet at a first node in a network, wherein the packet is received with a first segment-ID and another segment ID attached thereto;
detaching the first and the other segment IDs from the packet;
attaching a first label to the packet after the first and the other segment IDs are detached;
forwarding the packet with the attached first label directly to a second node in the network.
2. The method of claim 1 further comprising accessing a memory to read the first label mapped directly or indirectly to the other segment ID.
3. The method of claim 2 wherein, after the detachment of the first and the other segment IDs, the first node forwards the packet with attached label towards another node in the network via a label switched path (LSP), wherein the LSP comprises the second node and the other node.

4. The method of claim 3 further comprising an act of the first node creating the LSP between the first node and the other node, wherein the LSP is created prior to the first node receiving the packet with the first segment-ID and the other segment-ID attached thereto.

5. The method of claim 4 further comprising the second node swapping the first label with a second label, and the second node forwarding the packet with attached second label to a third node in the network.

6. The method of claim 4 further comprising:
the first node advertising the other segment-ID and another ID;
wherein the other ID uniquely identifies the other node in the network.

7. The method of claim 6 further comprising:
the first node advertising the first segment-ID and a first ID of the first node;
wherein the first ID uniquely identifies the first node in the network.

8. The method of claim 7 wherein the first node advertises the first ID bound to the first segment ID, and the other ID bound to the other segment-ID in a message generated and sent by the first node to other nodes in the network.

9. The method of claim 6 further comprising:
the first node determining the second node is not segment routing (SR) enabled;
wherein the first node advertises the other segment ID bound to the other ID in response to determining the second node is not SR enabled.

10. The method of claim 9 further comprising:
the first node determining the other node is not SR enabled;
wherein the first node advertises the other segment ID bound to the other ID in response to determining the other node is not SR enabled.

11. The method of claim 1 further comprising:
an edge node of the network receiving the packet;
the edge node attaching the first segment-ID and the other segment ID to the packet;
the edge node forwarding the packet with the attached first segment-ID and other segment-ID towards the first node via a segment path.

12. A non-transitory computer readable memory (CRM) storing instructions, wherein a node is capable of implementing a method in response to executing the instructions, the method comprising:
receiving a packet, wherein the packet is received with a first segment-ID and another segment ID attached thereto;
detaching the first and the other segment IDs from the packet;
attaching a first label to the packet after the first and the other segment IDs are detached;
forwarding the packet with the attached first label directly to a second node.

13. The non-transitory CRM of claim method of claim 12 further comprising:
advertising the other segment-ID and another ID before receiving the packet;
wherein the other ID uniquely identifies the other node in a network.

14. The non-transitory CRM of claim 13 wherein the method further comprises:
advertising the first segment-ID and a first ID;
wherein the first ID uniquely identifies the node in the network.

15. The non-transitory CRM of claim 14 wherein the node advertises the first ID bound to the first segment ID and the other ID bound to the other segment-ID in a message generated and sent by the node to other nodes in the network.

16. The non-transitory CRM of claim 13 wherein the method further comprises:
determining the second node is not segment routing (SR) enabled;
wherein the node advertises the other segment ID and the other ID in response to determining the second node is not SR enabled.

17. The non-transitory CRM of claim 14 wherein the method further comprises:
determining the other node is not SR enabled;
wherein the node advertises the other segment ID and the other ID in response to determining the other node is not SR enabled.

18. A system comprising:
an edge node configured to attach a first segment-ID and another other segment ID to a packet before the edge node forwards the packet and attached segment-IDs towards a first node;
the first node configured to
detach the first and the other segment IDs from the packet,
attach a first label to the packet after the first and the other segment IDs are detached, and
forward the packet with the attached first label directly to a second node.

19. The system of claim 18 wherein the first node is configured to advertise the first segment ID, a first ID, the other segment-ID and another ID, wherein the first ID and the other ID uniquely identify the first node and another node, respectively, in a network.

20. The system of claim 19 wherein the first node is configured to determine the second node is not segment routing (SR) enabled, wherein the first node is further configured to advertise the other segment ID and the other ID in response to determining the second node is not SR enabled.

* * * * *